United States Patent [19]

Freeman et al.

[11] 3,947,425

[45] Mar. 30, 1976

[54] RAPID CURING, HYDROPHILIC RESIN COMPOSITIONS

[75] Inventors: Harlan G. Freeman; Maurice F. Gillern, both of Seattle, Wash.; Harry A. Smith, Midland, Mich.

[73] Assignee: Weyerhaeuser Company, Tacoma, Wash.

[22] Filed: Sept. 13, 1973

[21] Appl. No.: 396,670

Related U.S. Application Data

[62] Division of Ser. No. 256,709, May 25, 1972, abandoned.

[52] U.S. Cl. ................ 260/51.5; 260/29.3; 260/50; 260/64; 260/65; 428/528; 428/529

[51] Int. Cl.²........................................... C08G 14/06

[58] Field of Search ....... 260/50, 65, 64, 51.5, 47 R

[56] References Cited

UNITED STATES PATENTS

| | | | |
|---|---|---|---|
| 3,471,443 | 10/1969 | Bornstein | 260/59 |
| 3,476,706 | 11/1969 | Bornstein | 260/54 |
| 3,518,159 | 6/1970 | Freeman et al. | 260/51.5 |
| 3,704,269 | 11/1972 | Freeman et al. | 260/51.5 |
| 3,714,121 | 1/1973 | Kobel et al. | 260/51.5 |
| 3,784,514 | 1/1974 | Tiedeman | 260/51.5 |
| 3,784,515 | 1/1974 | Freeman et al. | 260/51.5 |

*Primary Examiner*—Lester L. Lee
*Attorney, Agent, or Firm*—Christensen, O'Connor, Garrison & Havelka

[57] ABSTRACT

Described herein are hydrophilic resin products having particular utility in rapid curing adhesives for wood and other materials. Processes for producing these resins and hydrophilic adhesives produced therefrom are also described. The resins are prepared by reacting an aldehyde condensation polymer, such as a phenol-formaldehyde condensation polymer, with a strong mineral acid salt, i.e., a hydrochloric, nitric, or sulfuric acid salt, of m-hydroxy aniline, 2,6-diaminopyridine or 4,4'-diaminodiphenylmethane. When these resins are blended with an appropriate curing agent, such as an aldehyde, the resulting adhesives cure very rapidly at ambient temperatures. While uncured, these adhesives are hydrophilic and thus water washable, but when cured, they are insoluble in water and common organic solvents.

31 Claims, No Drawings

RAPID CURING, HYDROPHILIC RESIN COMPOSITIONS

This is a division of application Ser. No. 256,709, filed May 25, 1972, and now abandoned.

BACKGROUND OF THE INVENTION

This invention relates to rapid curing resin compositions, to adhesives prepared therefrom, and to methods of making and using such resins and adhesives.

U.S. Pat. No. 3,518,159; U.S. application Ser. No. 174,942, filed Aug. 25, 1971; (now U.S. Pat. No. 3,784,515) U.S. application Ser. No. 147,186, filed May 26, 1971; (now U.S. Pat. No. 3,784,514) and U.S. application Ser. No. 148,905, filed June 1, 1971; (now U.S. Pat. No. 3,784,516) each of which is assigned to the assignee of this application, collectively disclose resin products produced by reacting an aldehyde condensation polymer with a primary aromatic amine, heterocyclic amine or bis-aryl amine or acid salts of such amines. Upon blending of an appropriate hardening agent, such as formaldehyde, with the amine-modified polymers so produced, adhesives are obtained which cure very rapidly at ambient temperatures. These adhesives have particular utility as rapid-curing adhesives for wood and other materials. The amine-modified polymers specifically disclosed in the aforementioned patent and applications are organophilic as are most commercially employed construction adhesives. This is an undesirable attribute inasmuch as organic solvents must be employed to effect washing and clean-up of equipment and personnel, the use of organic solvents causing problems of flammability, toxicity, pollution and increased material costs. Because of their organophilic character, such adhesives often do not provide optimum bonding strengths on hydrophilic substrates such as wood and paper. When wood members bonded with these adhesives are to be used in high moisture environments, priming of the wood members prior to application of the adhesives is generally required to obtain superior bonding.

This invention is based on the discovery that hydrophilic resins can be produced by reacting an aldehyde condensation polymer, such as a phenol-formaldehyde condensation polymer, with a strong mineral acid salt of selected amines disclosed in the aforementiond patent and applications. Adhesives, which cure rapidly at ambient temperatures, can be prepared by combining these resins with a curing agent such as formaldehyde. The resins and uncured adhesives of this invention can be easily diluted and washed with water, and most of the resins and adhesives of this invention also wet hydrophilic substrates such as wood extremely well. However, once they have cured, the adhesives of this invention are waterproof and generally insoluble in common organic solvents.

SUMMARY OF THE INVENTION

This invention is directed to rapid curing, hydrophilic resin compositions comprising the reaction product of an aldehyde condensation polymer and a hydrochloric, nitric or sulfuric acid salt of m-hydroxy aniline (also "m-aminophenol"), 2,6-diaminopyridine or 4,4'-diaminodiphenylmethane or a mixture of such salts (which salts are in some instances hereinafter referred to collectively as "amine salts"); to adhesives comprising mixtures of such resin compositions with a curing agent; and to methods of making and using such resins and adhesives.

DESCRIPTION OF THE PREFERRRED EMBODIMENTS

"Polymers," as used herein, refers to resinous mixtures that ordinarily do not crystallize or have sharp melting points. "Condensation" is used herein to mean a polymerization reaction in which a molecule, such as water, is eliminated and is to be distinguished from "addition" in which no by-product is formed. "Reactive alkylol groups" are alkylol groups capable of reacting with the amine salts used in this invention to modify the aldehyde condensation polymers. The aldehyde condensation polymers used in this invention exclude those having dominant amide-forming substituents.

Two classes of aldehyde condensation polymers are preferred for use in this invention. These are phenoplasts and ketonealdehyde condensation polymers. Attempts to modify aminoplasts, such as urea-formaldehyde resins, with m-hydroxy aniline hydrochloride have not been successful. The aldehyde condensation polymers employed in the methods of this invention are preferably prepared so as to contain reactive alkylol groups which provide sites for further reaction with the amine salts. It is also preferred that the resins to be reacted with an amine salt not contain substantial amounts of free formaldehyde, i.e., not more than 0.5% by weight; otherwise, gelation can occur upon admixing of the amine salt with the resin.

Phenoplasts useful in the methods and compositions of this invention include condensation polymers of an aldehyde, such as formaldehyde, paraformaldehyde, polyoxymethylene, trioxane and aliphatic or cyclic aldehydes such as glyoxal and furfuraldehyde, with a phenolic-type material having at least two positions ortho and/or para to the hydroxyl group available for reaction, e.g., phenol, phenol-resorcinol, xylenol, cresol, resorcinol, and their derivatives. Ketone-aldehyde condensation polymers useful in this invention are exemplified by acetone-formaldehyde, methyl ethyl ketone-formaldehyde, and methyl isobutyl ketone-formaldehyde polymers such polymers further reacted with a polyhydroxy aromatic compound such as resorcinol.

One class of resins useful in this invention is ortho-condensed phenol-formaldehyde resoles made by condensing 0.7 to 1.0 moles formaldehyde with 1 mole phenol in the presence of an orthodirecting catalyst such as calcium acetate. Such resins are disclosed in U.S. Pat. No. Re. 26,881. These phenolic resins may be modified by incorporating into them predetermind amounts of other monohydric phenols or dihydric phenols such as resorcinol, or other polyhydroxy aromatic compounds.

A preferred class of resins for use in this invention are base- or weak acid-catalyzed phenol-formaldehyde resoles, preferably contaning an excess of free formaldehyde, further reacted with at least sufficient resorcinol to react with substantially all free formaldehyde. These resoles are preferably prepared using formaldehyde:phenol molar ratios of from 0.7:1 to 5:1 and resorcinol:phenol molar ratios of from 0.5:1 to 8:1. Base-catalyzed phenol-formaldehyde resoles are preferred.

Another preferred class of resins is prepared by reacting an aldehyde and a ketone, typically under mildly alkaline conditions, and then further reacting the resulting resin (or "prepolymer") with a polyhydroxy aromatic compound (see Example 1 herein). The aldehyde:ketone mole ratios in these products are generally from 1.5:1 to 6:1, preferably from 2.5:1 to 4.5:1 and most preferably from 3:1 to 4:1. It is preferred that these prepolymers contain a substantial excess of free aldehyde, e.g., 15% by weight. The amount of polyhydroxy aromatic compound reacted with the ketone-aldehyde prepolymer should be such that the resulting resin contains substantially no free aldehyde, i.e., less than 0.5% by weight. The molar ratio of polyhydroxy aromatic to aldehyde in the ketone-aldehyde resin is generally from 0.2:1 to 5:1, preferably from 0.3:1 to 2:1 and most preferably from 0.75:1 to 1.25:1. Exemplary of aldehydes useful in these resins are formaldehyde, paraformaldehyde, trioxane, aldol, acetaldehyde and glyoxal. Useful ketones include acetone, methyl ethyl ketone and methyl isobutyl ketone. The polyhydroxy aromatic can be, for example, resorcinol, phloroglucinol, quebracho or a polyhydric, polynuclear aromatic prepared by reacting monochlorophenols with alkali metal hydroxides as described in Canadian Pat. Nos. 771,746 and 828,791. Acetone-formaldehyde resins further reacted or modified with resorcinol are preferred.

Of the amine salts useful in this invention, the hydrochloride salts and particularly m-hydroxy aniline hydrochloride (sometimes referred to hereinafter as "m-HA.HCl") are presently preferred. The amine salts are generally employed in aqueous solutions prepared by reacting at least 0.75 equivalent of acid per mole of amine. If this ratio is lower than 0.75, the hydrophilicity of the resins produced may be diminished to an unacceptable degree.

As indicated previously, polymers modified with the amine salts employed in this invention are hydrophilic whereas polymers modified with the corresponding free amines are organophilic. This difference is thought to result from the presence of more pendant, hydrophilic amino groups in the amine salt-modified polymers. This in turn is thought to result from a lower reactivity of amino groups in the amine salt during the modification reaction.

In order to produce products which cure rapidly (i.e., in less than 15 minutes) at low temperatures, it is desirable first to produce the aldehyde condensation polymer and then subsequently modify that polymer by reaction with one of the amine salts used in the compositions and methods of this invention. Simultaneous reaction of all the reactants, e.g., phenol, formaldehye and amine salt, generally produces an inferior, heterogeneous mass. The amount of amine salt reacted with the aldehyde condensation polymer generally ranges from about 0.05 to about 2.0 parts, preferably 0.1 to about 1.0 parts, by weight of the amine salt to each part of polymer. More than about 2.0 parts by weight of the amine salt to each part of the polymer can be used, but there is usually litttle advantage in doing so. The minimum amount of amine salt necessary to yield a product exhibiting the desired cure speed can be readily determined by experimentation.

Most of the amine salts disclosed react with aldehyde condensation polymers at room temperature, but to obtain more rapid reaction, the mixtures are usually heated to reflux. The reactions are usually exothermic in nature and cooling is required to control the reaction. This exothermic nature of the reaction can in some instances be controlled by slow addition of the amine salt to the polymer. It may be desirable under some circumstances, however, to add the polymer to a solution of the amine salt. Although it is generally desirable to heat the mixtures of aldehyde condensation polymer and amine salt (or "cook in" in the amine salt), it is frequently possible to produce a very useful hydrophilic adhesive merely by adding the amine salt at ambient temperatures and at the time of use adding a hardener, such as formaldehyde. For example, it has been found that when a resorcinol-modified acetone-formaldehyde resin of the type described above is admixed at ambient temperature with an amine salt and the resulting reaction product is later combined with a formaldehyde-containing hardener, an excellent adhesive is produced, e.g., see Examples 1(d) and 1(e) herein. Upon addition of the hardener, a mild exotherm occurs and the adhesive thereafter transforms from liquid to solid almost instantaneously to provide a "snap cure." The cure is accompanied by a noticeable color change.

The amine salt-modified aldehyde condensation polymers make the first component of the adhesives of this invention. The first component is prepared so as to have a relatively long storage life so it can be shipped and stored for fairly long periods of time without gelation. The second component of the adhesives of this invention is a curing agent or hardener which is an alkylene donating compound such as formaldehyde, a formaldehyde-forming compound (e.g., polyoxymethylene, trioxane and paraformaldehyde), and water soluble resinous condensation products containing excess free formaldehyde. In some instances, diioscyanates, hydrophilic epoxides, and hydrophilic epoxide-aldehyde mixtures also can be used (e.g., see Example 7 herein).

The adhesives of this invention are generally prepared immediately prior to use by blending together the amine salt-modified aldehyde condensation polymer and the hardener, preferably using automatic metering-mixing-dispensing apparatus. To achieve rapid, uniform blending, the two components desirably have similar viscosities. Reaction between the modified polymer and hardener generally takes place at ambient temperatures and the blended mixture gels rapidly to an insoluble, infusible state. The preferred adhesives of this invention set to an insoluble, infusible state within a few minutes. (By "insoluble" is meant not soluble in common solvents such as water, alcohols, ketones hydrocarbons, esters, glycols, and the like.) Optionally, heat may be applied if desired to further decrease the required cure time. Sufficient hardener is added to the first component to form an insoluble, infusible product. The amount will generally range, for example, from 0.05 to 2.0 parts by weight per part of amine salt-modified polymer. The cure rate of the adhesives of this invention depends in part on the choice of hardener and in part on the amount of hardener employed. Thus, the use of a formaldehyde solution rather than an equivalent amount of powdered paraformaldehyde, for example, will yield a faster curing adhesive, and up to a point, cure rate will increase with increasing amounts of hardener. It should be noted that in general the adhesives of this invention are mass sensitive, meaning that they cure somewhat more rapidly when in large volumes than they do when in the form of thin films.

The adhesives of this invention generally cure most rapidly and give superior bonds when cured at low pH, i.e., less than 3.0. However, as is well known, the use of adhesives having such a low pH to bond wood members can result in gradual degradation of wood along the cured glue line when the adhesive is exposed to hydrolytic conditions, e.g., if the wood has a high moisture content at the time the adhesive is applied or if the bonded structure is subsequently exposed to a moist environment for a prolonged period. Such degradation apparently results from gradual leaching of acid from the cured adhesive and consequent hydrolysis of the wood. When bonded structues are sheared along the glue line, such degradation usually is evidenced by very low shear strengths coupled with shallow wood failure over a large percentage of the area adjacent the glue line.

Experience indicates that a glue line pH of 3.5 is a common "safe" minimum for long-term wood stability. (ASTM D2559-66T-6.1 specifies that wood adhesives shall have a pH of no less than 2.5, while Military Specifications for Wood Adhesives, Mil.-A-397B-3.7, specifies a minimum pH of 3.5.) However, where bonded wood structures are likely to be subject to conditions of high temperature and high humidity, even higher pH's may be necessary to prevent degradation completely. In the U.S. application of G. T. Tiedeman and M. F. Gillern, Ser. No. 256,708 now U.S. Pat. No. 3,872,051 entitled "Adhesives Containing Metal Powders," filed concurrently herewith (which application is incorporated herein by reference), there is disclosed and claimed an invention which enables curing of an adhesive at low pH, e.g., less than 3.0 and yet will result in a cured adhesive which, when subjected to hydrolytic conditions, will cause little or no wood degradation and which will exhibit a pH well above the safe minimum of 3.5 referred to above. The Tiedeman et al. invention involves incorporating into the adhesive a powdered metal, e.g., aluminum or iron. The powdered metal, which survives curing conditions, apparently functions as a "latent" acid scavenger to react with and consume hydrogen ions liberated when the adhesive is subjected to hydrolytic conditions, i.e., exposed to moisture.

The metal powder can be incorporated into the adhesives of this invention in a variety of ways. For example, the metal can be added directly to the remainder of the adhesive components or, where an adhesive is prepared by combining a resin with a hardening agent which has a pH of about 7 or above, the metal powder can be conveniently incorporated into the adhesive via the hardener. Generally, the metal should not be added to an acidic resin or hardener until it is ready to be used. Because of its low equivalent weight, good reactivity with acids and relative softness (important when bonded wood structures are to be sawed), aluminum is the preferred metal for use in the methods and compositions of this invention.

A well-recognized method for determining the pH of cured adhesives and bonded assemblies is Fed. Test Method Std. No. 175 — Method 4011 (1956), which is incorporated herein by reference. According to this method, an adhesive is cast on glass as a thin film and the film is cured, dried and ground to (−) 40 mesh. Two grams of the powder are suspended in 10 ml. of distilled water and the pH of the resulting suspension is measured after 15 min. and again every 24 hours until the values are constant within 0.05 pH unit, the stable value being taken as the pH of the adhesive. When reference is made herein to the pH of or exhibited by a cured adhesive, the pH has been or is to be determined according to this method. The amount of metal powder necessary to produce an adhesive which, when cured will exhibit a given pH upon exposure to hydrolytic conditions, e.g., at least the safe value of 3.5 referred to previously, can be readily determined by the just-described method.

The amount of metal necessary to prevent degradation of wood members bonded with the adhesives of this invention (or to reduce such degradation to an acceptable level) can also be determined by experimentation by varying the amount of metal employed, subjecting the bonded structures to hydrolytic conditions and observing the effect of such variations on the shear strength and wood failure along the glue line. Low shear strength (e.g., 50 p.s.i.) coupled with high, shallow wood failure along the glue line (e.g., 100 percent) is generally indicative of wood degradation. Accelerated "aging" of test specimens can be effected by boiling. The amount of metal necessary to prevent wood degradation or reduce it to an acceptable level will depend upon various factors including the pH at which the adhesive is cured, the fineness, shape and uniformity of distribution of the metal particles, the equivalent weight of the metal and the temperature and humidity conditions to which the bonded structures are to be exposed. Generally, it will be desirable to use an amount of metal which will cause the adhesive to have a pH under hydrolytic conditions of at least 3.0 and preferably at least 3.5. It has been found that 1.7 equivalents of aluminum powder per equivalent of available acid in the adhesive is generally more than adequate to provide a cured adhesive having a pH of at least 3.5 under hydrolytic conditions.

The particle size of the metal should be small in order to minimize the amount needed to prevent wood degradation. Spheroidal particles of less than 40 mesh or flaked particles of comparable surface area are preferred. Upon storage of liquid resins and hardeners containing metal powders having very high surface areas (e.g., atomized aluminum powders of less than 100 mesh), problems can ensue due to reaction between the highly reactive metal powder and trace amounts of water present in the resin or hardener. The consequent evolution of hydrogen gas and foaming of the resin of hardener usually can be avoided by employing sizes and shapes of metal particles selected so that the metal-water reaction will proceed slowly enough to permit dissipation of the reaction by-products and heat.

The following examples are provided by way of illustration only and are not intended to be limiting of the invention. All parts and percentages are by weight unless otherwise indicated. The "water washability" of selected resins of the following examples was determined as follows: at room temperature, a metal spatula was immersed into a resin to a depth of one to two inches. The spatula was withdrawn with liquid resin adhering thereto and placed under a stream of cold (60°–70°F.) water. The resin was observed visually and tactily to determine whether it was miscible with water, water washable and cleanly rinsable from the spatula. Resins that are not water washable precipitate, become milky in color and gummy to the touch and adhere to the spatula.

In the following examples the results of "Block Shear Tests" on adhesives of this invention are reported in terms of "shear strength" and "% wood failure." The followng procedures were employed in these tests. A liquid adhesive was spread on the face of one of a pair of matched, longitudinally-grained Douglas fir strips (¾ in. × 2½ in. × 12 in.). The two strips were then superimposed fact-to-face and clamped together at a selected pressure and for a selected time 72°F. The resulting laminate was sawed transversely to produce five specimens which were trimmed to dimensions of 1½ in. × 2 in. × 2 in. Each of these specimens was then sawed across the grain to remove one ¼ in. × ¾ in. × 2 in. strip from each lamina (the strips being removed from opposite ends of the specimen). The laminae in the resulting specimens were thus offset by ¼ in., the remaining glue line having an area of 3.0 sq. in. ( 1.5 in. × 2.0 in.). Two specimens were "dry" conditioned at about 70°F. and 50% relative humidity for 48 hours, and three were subjected to "wet," cyclic conditioning according to the following modification of ASTM D1101-59 (1965). The three wet specimens were placed in an autoclave filled with water (65° to 80°F.) so that the specimens were completely submerged. A vacuum (20 in.–25 in. of mercury) was then applied and held for about 30 min. The vacuum was then released and air pressure of about 75 p.s.i. was immediately applied and held for about 120 min. The specimens were then placed in a forced-air drier at 150°F. and 8–10 percent relative humidity until they had returned to within 15 percent of original weight (about 20 to 22 hrs.). All conditioned specimens were sheared at 0.05 in./min. load rate (applied to one of the offset ends), the maximum (breaking) load (p.s.i.) for each specimen was determined and separately averaged for dry and wet specimens, and the "shear strengths" were then calculated (shear strength (p.s.i.) = max. load (lbs.)/3.0 in.$^2$). The percent wood failure along the glue line was estimated for each specimen and averaged for dry and wet specimens.

The metal powders used in the following examples were "purified " grades and consisted of spherical particles of less than 40 mesh.

EXAMPLE 1

(a) m-HA.HCl (48.5%) utilized in the procedures of this and subsequent examples herein was prepared according to the following procedure unless otherwise indicated. To 31.7 parts water were added 32.0 parts hydrochloric acid (38%) and to the resulting solution was added 36.3 parts m-hydroxy aniline with stirring. Stirring was continued until all the m-hydroxy aniline was dissolved. There resulted a 48.5% aqueous solution of m-HA.HCl.

b. A 5-gallon reactor was charged with the following:

17,180.5 g. formaldehyde (49.9%)

1,236.1 g. water 4.173.1 g. acetone

The temperature of the reaction mixture was raised to 40°C. and 45.2 g. sodium hydroxide (49.7%) was added with stirring. The solution was then cooled to 30°C. and an additional 45.2 g. sodium hydroxide (49.7%) was added with continued stirring. The temperature of the reaction mixture was then raised to 65°C. in 60 min. at a uniform rate. No heating was required above 36°C.; occasional cooling was applied to control the exotherm. The reaction mixture was mantained at 65°–70°C. for 20 min. and was then cooled to 25°C. The acetone-formaldehyde resin so produced had a free formaldehyde content of 16%.

(c) A one-liter reactor was charged with 346.9 g. of acetone-formaldehyde resin produced according to Example 1(b). The resin was agitated and heated to 60°C. whereupon there was added 462.8 g. resorcinol. Heating was reapplied as needed to bring the temperature from 35°C. to reflux (106°C.) in about 15 to 20 min. At about 80°C., an easily controlled exotherm was noted; intermittent cooling was applied to achieve the 15 to 20 min. heat-up period. A mild exotherm continued and maintained reflux for approximately 5 min. After the exotherm subsided, the mixture was cooled to 100°C. and 190.3 g. m-HA.HCl (48.5%) was added. The resulting mixture was heated from 86°C. to reflux (106°C.), held there for 2 hrs., and then cooled to 25°C. The resulting resin was water washable, had a pH of 2.4 and a Gardner viscosity of "C" at 25°C. Ten grams of the resin and five grams of "Methyl Formcel" (a 55% formaldehyde solution in methanol and water available from Celanese Corp.) were stirred together at 25°C. in a small beaker usng a wooden tongue depressor. Stirring was continued until hardening of the resulting adhesive occurred. The elapsed time from initial mixing to hardening ("Pot Life") was 4 min., 20 sec. This method was employed to determine the Pot Lives of adhesives reported in subsequent examples; in some instances, where indicated, 30 g. of resin was combined with 15 g. of hardener.

(d) A one-liter reactor was charged with 428.4 g. of the acetone-formaldehyde resin of Example 1(b). The resin was agitated and heated to 60°C. whereupon 571.6 g. resorcinol was added. Heating was immediately reapplied and continued as needed to raise the temperature of the reaction mixture from 34°C. to 106°C. (reflux) in 20 min. At about 80°C., an easily controlled exotherm was noted; intermittent cooling was applied to achieve the 20 min. heat-up scheduled. A mild exotherm continued for approximately 5 min. after reaching reflux. Reflux was maintained for a total of two hours and the resulting resorcinol-modified acetone-formaldehyde resin was cooled to room temperature. The resin had a pH of 2.4 and a Gardner viscosity of "GH" (i.e., between "G" and "H") at 25°C. At room temperature, 19.03 parts m-HA.HCL (48.5%) was added to 80.97 parts of the resin and the resulting mixture was stirred until homogeneous. The resulting resin was water washable, had a pH of 2.5 and a Pot Life of 5 min., 4 sec., at 23°C.

(e) Two parts of each of the resin products of Example 1(c) and Example 1(d) were individually combined with one part of a hardener consisting of Methyl Formcel thickened with sufficient hydroxyalkyl cellulose ("Klucel M" obtained from Hercules Inc.) to yield a final Gardner viscosity of "U". The Pot Life and Block Shear Test results for each of the resulting hydrophilic adhesives are provided in Table 1.

Table 1

| Resin | Pot Life* | Block Shear Tests** Shear Strength (psi)/Wood Failure % Dry | Wet |
|---|---|---|---|
| Example 1(c) | 2 min., 38 sec. | 1230/90 | 310/97 |

Table 1-continued

| Resin | Pot Life* | Block Shear Tests** Shear Strength (psi)/Wood Failure % Dry | Wet |
|---|---|---|---|
| Example 1(d) | 3 min., 10 sec. | 1310/85 | 650/85 |

*Thirty grams of resin and fifteen grams of hardener.
**Specimens were clamped at 150 p.s.i. for 20 min. at room temperature.

EXAMPLE 2 a. A 4-liter reactor was charged with the following:

1.266.2 g. phenol (91.4%)
428.9 g. water
1,185.0 g. formaldehyde (49.8%)
97.8 g. methanol The temperature of the reaction mixture was adjusted to and maintained at 40°C. while 75.5 g. sodium hydroxide (49.7%) was added. The reaction mixture was then heated from 40°C. to 65°C. in 70 min. at a uniform rate. No external heating was required above about 45°C.; intermittent cooling was applied. The reaction mixture was maintained at 65°C. for 105 min. The pH of the reaction mixture was then adjusted to 8.3 with 90% formic acid (15.5 g). The reaction mixture was then maintained at 65°C. for 3 hrs. There was then added 1,365.6 g. formaldehyde (49.8%) with mixing. The resulting resin had a Gardner viscosity of "$A_4A_3$" at 25°C. and a free formaldehyde content of about 15percent.

b. A one-liter reactor was charged with 273.5 g. of the phenol-formaldehyde resin of Example 2(a). Heating and agitation were applied, bringing the temperature of the reaction to 60°C. whereupon there was added 364.8 g. resorcinol. Heating was immediately reapplied bringing the temperature from 39°C. to 80°C., at which point a mild exotherm was noted. No external heating was used from 80°C. to 100°C. where the exotherm subsided. Heating was reapplied and the mixture was brought to reflux (107°C.) and held for 1 hr. The heat-up time from 39°C. to 107°C. was approximately 15 min. The reaction mixture was then cooled slightly to 100°C. and 361.7 g. m-HA.HCl (48.5%) was added. The reaction mixture was then heated from 74°C. to reflux (105°C.), was held at reflux for 3 hrs. and then cooled to 25°C. The resulting hydrophilic resin had a pH of 2.75, a Gardner viscosity of "IJ" at 25°C., and free formaldehyde content of about 0.3 percent.

c. The procedure of Example 2(b) was repeated with the modification that, after the addition of m-HA.HCl, reflux was held for 2 hrs. rather than for 3 hrs. as in Example 2(b). The resulting hydrophilic resin had a pH of 2.55 and a Gardner viscosity of "EF" at 25°C.

d. Two parts of the resins of parts (b) and (c) of this example were individually combined with one part of selected hardeners of Table 2, which were prepared by mixing together the indicated ingredients in the order recited. Pot Lives for each of the resulting hydrophilic adhesives and results of Block Shear Tests are set forth in Table 3.

Table 2

| Ingredients | Hardeners (Weight Percent) I | II | III | IV | V |
|---|---|---|---|---|---|
| "U.F. 85"* | 98.71 | 49.02 | 71.80 | 71.80 | 100.00 |
| Resin of Example 2(a) | | 49.02 | | | |
| Ethanol | | | 15.38 | 15.38 | |
| Calcium Carbonate | .30 | .50 | .51 | | |
| Portland Cement | | | | .51 | |
| Walnut Shell Flour | | | 7.18 | 7.18 | |
| Pyrogenic Silica** | | | 5.13 | 5.13 | |
| Refined Chrysotile Asbestos | .99 | 1.46 | | | |

*A concentrated urea-formaldehyde resin precursor containing an excess of free formaldehyde and about 15% water available from Allied Chemical Corp.
**"Cab-O-Sil M-5" -- a powdered pyrogenic silica available from Cabot Corporation; the pyrogenic silica renders the hardener thixotropic.

Table 3

| Adhesive Resin | Hardener (Table 2) | Pot Life (seconds) | Block Shear Tests* -- Shear Strength (psi)/ Wood Failure (%) Dry | Wet |
|---|---|---|---|---|
| Example 2(b) | III | 62 | 1560/92 | 380/95 |
| " | V | 53 | 1730/95 | 330/95 |
| Example 2(c) | I | 70 | 1530/92 | 940/92 |
| " | II | 70 | 1730/82 | 430/52 |
| " | III | 63 | 1590/98 | 500/85 |
| " | IV | 47 | 1680/100 | 770/90 |

*Specimens were clamped at 75 p.s.i. for 15 min. at room temperature.

EXAMPLE 3 a. A 5-gallon reactor was charged with the following:

6,569.7 g. phenol (90.4%)
2,238.6 g. water
6,034.3 g. formaldehyde (50.2%)
500.2 g. methanol The temperature was adjusted to 35°C. whereupon there was added 383.9 g. sodium hydroxide (50.1%). The temperature of the reaction mixture was allowed to rise from 41°C. to 65°C. in 70 min. at a uniform rate; no external heating was required during the heat-up. The reaction mixture was maintained at 65°C. for 105 min. and was then adjusted to pH 8.4 with 124.0 g. formic acid (90.7%). The reaction mixture was maintained at 65° until 3 hrs. had elapsed from the start of pH adjustment. There was then added 6,952.2 g. formaldehyde (50.2%) and the reaction mixture was mixed thoroughly while cooling to 25°C. The resulting phenol-formaldehyde resin had a final viscosity of $A_4A_3$.

b. A 100 ml. reactor was charged with 26.49 g. of the phenol-formaldehyde resin of Example 3(a). Heating was applied bringing the temperature from 22°C. to 60°C. whereupon 35.33 g. resorcinol was added. Heating was reapplied bringing the temperature from 38°C. to 61°C. at which point a mild exotherm was noted. No external heating was applied from 61°C. to reflux (105°C.). The exotherm ceased after 5 min. at reflux, and the reaction mixture was then cooled to 100°C. A solution of 21.23 g. 2,6-diaminopyridine hydrochloride (0.75 moles HCl per mole of 2,6-diaminopyridine) in 22.54 g. water was added to the reaction mixture. From 79°C., the mixture was again heated to reflux (106°C.) which was maintained for 2 hrs. The reaction mixture was then cooled to 25°C. The resulting resin was clear, infinitely water soluble, had a pH of 4.2 and a Gardner viscosity of "CD" at 25°C. After being removed from the reactor, 3.15 g. "Cab-O-Sil M-5" pyrogenic silica was added to the reaction mixture.

c. Example 3(b) was repeated substituting for 2,6-diaminopyridine hydrochloride solution a solution of 4,4'-diaminodiphenylmethane hydrochloride (prepared by dissolving 23.11 g. 4.4'-diaminodiphenylmethane in a solution of 22.39 g. HCl (38%) in 19.70 g. water). The reaction mixture was then heated from 90°C. to reflux (106°C.), maintained at reflux for 2 hrs. and then cooled to 25°C. The resulting resin exhibited good water washability (slight cloudiness during wash-up) and had a pH of 2.3 and a Gardner viscosity of "EF" at 25°C. After being removed from the reactor, 3.15 g. Cab-O-Sil M-5pyrogenic silica was added to the reaction mixture.

d. The following ingredients were combined in the order recited with agitation and mixing until a homogeneous composition was obtained:

| Ingredients | Weight % |
|---|---|
| "U.F. 85" | 64.42 |
| Ethanol-formaldehyde Solution (50%) | 21.21 |
| Calcium Carbonate | 1.00 |
| Aluminum Powder | 3.50 |
| Walnut Shell Flour | 5.92 |
| "Cab-O-Sil M-5" Pyrogenic Silica | 3.95 |
| | 100.00 |

One part of this hardener (VI) was mixed with two parts of the resin of Example 3(b) and the resulting hydrophilic adhesive was subjected to the Block Shear Test. The shear strength (p.s.i.)/% wood failure values for dry- and wet-conditioned specimens were 1400/92 and 350/80, respectively. The adhesive had a Pot Life of 4min., 35 sec. One part of hardener VI was also mixed with two parts of the resin of Example 3(c) and the resulting hydrophilic adhesive was subjected to the Block Shear Test. The shear strength (p.s.i.)/% wood failure values for dry-conditioned specimens were 1210/60. Wet-conditioned specimens delaminated during conditioning indicating that priming of the wood prior to application of this adhesive may be advisable (see second note to Table 5 hereinafter). This adhesive had a Pot Life of 1 min., 58 sec.

EXAMPLE 4 a. A 4-liter reactor was charged with the following:

1,690.0 g. phenol (90.4%)

401.6 g. paraformaldehyde flakes (94%)

10.8 g. water 16.8 g. calcium acetate

The temperature was adjusted to 25°C. Heating and agitation were then applied bringing the mixture to reflux (110°C.) uniformly over a 60 min. period. The reflux was maintained for 2 hrs., and the mixture was cooled slightly to 100°C., whereupon there was added 1,880.8 g. m-HA.HCl (48.5%). From 68°C. the mixture was heated to reflux (105°C.), the reflux was maintained for 2.5 hrs. and the resulting resin was then cooled to 25°C. The resin was water washable, had a pH of 2.3 and a Gardner viscosity of "WX" at 25°C. Varying the pH of this resin substantially can cause some precipitation to occur. Therefore, it should be used with a neutral or, preferably, acidic hardener. (It is anticipated that by combining this resin with a hardener of substantially the same pH, a good "primerless" adhesive will be produced; see the second note to Table 5 hereinafter.)

b. A 5-gallon reactor was charged with 6,007.9 g. of phenol-formaldehyde resin prepared as described in Example 3(a). The temperature was raised from 25°C. to 60°C. whereupon 8,013 g. resorcinol was added. Heating was immediately reapplied bringing the temperature from 44°C. to 71°C. in 5 min. at which point a mild exotherm was noted. No external heating was applied from 71°C. to 104°C. where the exotherm subsided. Heating was again applied and the reaction mixture was heated to reflux (105°C.) and maintained there for 5 min. The mixture was cooled to 100°C., and 7,944.8 g. m-HA.HCl (48.5%) was added. From 76°C. the mixture was heated to reflux (105°C.), and the reflux was held for 2 hrs. The resin was then cooled to 45°C., and 714.4 g. of pyrogenic silica (Cab-O-Sil M-5) was added with mixing. The resulting mixture was water washable and had a pH of 2.60.

c. The procedure of Example 4(b) was repeated with the following modifications. The amounts of base resin, resorcinol and m-HA.HCl employed were 271.2 g., 361.7 g. and 358.6 g. respectively. After the addition of the m-HA.HCl, the reaction mixture was stirred thoroughly at 75°C. and thickened by adding 8.5 g. of the hydroxyethyl cellulose described in Example 5(a) hereinafter; no pyrogenic silica was added. The reaction mixture was heated from 75°C. to reflux with vigorous agitation to avoid lumping of the hydroxyethyl cellulose. The reflux temperature (104°C.) was maintained for 2 hrs. and the resin was then cooled to 25°C. The resulting hydrophilic resin had a pH of 2.60 and a Gardner viscosity of "MN" at 25°C.

d. Liquid hardener formulations containing varying amounts of aluminum powder were prepared by mixing together the ingredients shown in Table 4 in the order recited. One part of the hardeners was individually combined with two parts of the final resins of Examples 4(a), (b) and (c). Films of the resulting adhesives were cast, and the pH values of powders of the resulting films were determined as described above; the results are shown in Table 5 as are the results of Block Shear Tests on the adhesives.

Table 4

| Ingredients | Hardener (Weight Percent) VII | VIII | IX |
|---|---|---|---|
| "U.F. 85" | 60.0 | 60.0 | 56.0 |
| Water | 7.5 | 7.5 | 7.5 |
| "Dow Latex 612"* | 25.0 | 24.0 | 23.5 |
| Calcium Carbonate** | 1.0 | 1.0 | 1.0 |
| Aluminum Powder | 3.5 | 5.0 | 10.0 |
| Pyrogenic Silica ("Cab-O-Sil M-5" | 3.0 | 2.5 | 2.0 |
| | 100.0 | 100.0 | 100.0 |

*A styrene-butadiene polymer available from The Dow Chemical Co.; the poly-

Table 4-continued

| Ingredients | Hardener (Weight Percent) VII | VIII | IX |
|---|---|---|---|

mer was added to enhance the impact strength of adhesives into which the hardeners are incorporated.
**Calcium carbonate causes evolution of $CO_2$ giving a desirable gap-filling quality to the adhesives.

Table 5

| Adhesive Resin | Hardener (Table 4) | pH of Cured Adhesive | Block Shear Tests* -- Shear Strength (psi)/ % Wood Failure Dry | Wet |
|---|---|---|---|---|
| Example 4(a) | VII | 4.30 | 1280/55 | 0/0** |
| " | IX | 4.41 | 1760/25 | 0/0** |
| Example 4(b) | VII | 4.15 | 1300/95 | 790/85 |
| " | VIII | 4.20 | 2020/82 | 320/23 |
| " | IX | 4.35 | 1970/92 | 370/52 |
| Example 4(c) | VII | 4.28 | 1550/82 | 650/67 |
| " | VIII | 4.35 | 1500/100 | 460/80 |
| " | IX | 4.49 | 1550/90 | 860/43 |

*Specimens were clamped at 75 p.s.i. for 30 min. at room temperature.
**These specimens delaminated upon wet-conditioning; this is believed to be due to inadequate wetting of the wood by the adhesive. These two adhesives give excellent bonding if the wood is first primed, for example, with a phenol-formaldehyde resin modified with resorcinol (see U.S. Patent Re. 26,881) diluted with methanol and cured with a 55% formaldehyde solution in methanol and water ("Methyl Formcel" -- available from Celanese Corporation) as described in U.S. application Serial No. 822,009, filed May 5, 1969, which is incorporated herein by reference.

EXAMPLE 5 a. To a reactor equipped with an agitator, thermometer and means of heating and cooling was added 30.67 parts water and 30.96 parts hydrochloric acid (38%). With agitation, there was then added 35.12 parts m-hydroxy aniline. Mixing was continued until the m-hydroxy aniline was dissolved. A mild exotherm occurred. The reaction mixture was then cooled to 25°C., and then thickened by adding with vigorous agitation 3.25 parts of a hydroxyethyl cellulose having a 0.9 to 1.0 degree of substitution and a 1.6 to 2.0 molar substitution of ethylene oxide, and a 2% solution LVT Brookfield viscosity of 70 to 110 cps. at 25°C. in the L range ("Cellosize QP 40 high" — Union Carbide Corp.). When the thickened solution was lump-free, it was heated to 40°C., held there for 30 min., and then cooled to 25°C. The solution had a pH of 2.65 and a Gardner viscosity of "$Z_3Z_4$" at 25°C.

b. A reactor equipped with an agitator, thermometer and means of heating and cooling was charged with 26.08 parts phenol, 12.37 parts water, 26.61 parts formaldehyde (50%) and 2.20 parts methanol. The temperature of the reaction mixture was adjusted to 40°C. and 1.69 parts sodium hydroxide (50%) was added. The temperature of the reaction mixture was raised from 40° to 60°C. in 70 min. at a uniform rate; a mild exotherm occurred above 45°C. The reaction mixture was maintained at 65°C. for 105 min. The pH of the reaction mixture was then adjusted to 8.3 by incremental additions of approximately 0.39 parts formic acid (90%). The reaction mixture was held at 65° for 3 hrs. from the beginning of the pH adjustment period. There was then added 30.66 parts formaldehyde (50%) and after thorough mixing, the reaction mixture was cooled to 25°C.

c. To a reactor equipped with an agitator, thermometer and means of heating and cooling was added 25.94 parts of the resin of Example 5(b). The resin was heated to 60°C., whereupon 34.58 parts resorcinol was added. The resulting mixture was heated from about 40°C. to reflux (104°C.) uniformly in 20 min. An exotherm occurred about 62°C. and became strong above 70°C. Cooling was used to control the up-heat curve. The reaction mixture was refluxed for 5 min. and then cooled to 100°C., whereupon 35.44 parts of the thickened m-HA.HCl solution of Example 5(a) was added. The reaction mixture was then heated to reflux (105°C.) and maintained there for 2 hrs. The reaction mixture was then cooled to 45°C. and 4.04 parts of pyrogenic silica (Cab-O-Sil M-5) was added with thorough mixing. The resulting mixture was then cooled to 35°C.

d. A liquid hardener formulation (X) was prepared by mixing together the following ingredients in the order recited:

| Ingredients | Weight % |
|---|---|
| "U.F. 85" | 60.64 |
| Water | 7.59 |
| "Dow Latex 612" | 25.27 |
| Calcium Carbonate | 1.00 |
| Aluminum Powder | 3.50 |
| Pyrogenic Silica ("Cab-O-Sil M-5") | 2.00 |
| | 100.00 |

One part of hardener VI (Example 3(d)) and one part of hardener X were individually combined with two parts of the resin of Example 5(c). The Pot Life of each of the resulting adhesives at temperatures from 50° to 80°F. is shown in Table 6, as are the Block Shear Test results for the two adhesives. Both of the liquid adhesives were hydrophilic and readily washable with water.

Table 6

| Adhesive Resin | Hardener | Pot Life (sec.)* 50°F | 60°F | 70°F | 80°F | Block Shear Tests -- Shear Strength (psi)/ % Wood Failure** Dry | Wet |
|---|---|---|---|---|---|---|---|
| Example 5(c) | VI | 96 | 72 | 32 | 28 | 1324/92 | 390/77 |

Table 6-continued

| Adhesive | | Pot Life (sec.)* | | | | Block Shear Tests -- Shear Strength (psi)/ % Wood Failure** | |
|---|---|---|---|---|---|---|---|
| Resin | Hardener | 50°F | 60°F | 70°F | 80°F | Dry | Wet |
| " | X | 162 | 101 | 54 | 47 | 1695/93 | 440/93 |

*Thirty grams resin and 15 grams hardener.
**Specimens were clamped at 75 p.s.i. for 15 min. at room temperature.

EXAMPLE 6 a. To a solution of 286.0 g. nitric acid (70–71%) in 330.3 g. water was added with mixing 351.2 g. m-hydroxy aniline. Mixing was continued until a clear solution developed. The solution was cooled from 51°C. to 25°C. whereupon there was added 32.5 g. of the hydroxyethyl cellulose described in Example 5(a). Vigorous agitation was used until all the hydroxyethyl cellulose had wetted. The mixture was then heated to and maintained at 40°C. for 30 min. The product had a pH of 2.65 and a Gardner viscosity of "$Z_3Z_4$" at 25°C.

b. A one-liter reactor was charged with 259.4 g. of phenol-formaldehyde resin prepared as described in Example 3(a). The resin was heated to 60°C. with agitation and 345.8 g. resorcinol was then added. Heating was immediately reapplied bringing the temperature from 40°C. to 62°C. in 4 min. At 61°C. a mild exotherm was noted. No external heating was applied from 61°C. to 105°C. (reflux). Heat-up time from 40° to 105°C. was approximately 10 min. After 5 min. at reflux, the reaction mixture was cooled to 100°C. and 354.4 g. of the m-hydroxy aniline nitrate solution of Example 6(a) was added. From 81°C., the reaction mixture was heated to reflux (105°C.) and was maintained at reflux for 2 hrs. The resin was then cooled to 40°C. and 40.4 g. Cab-O-Sil M-5 pyrogenic silica was added. After thorough mixing, the resin was cooled to 25°C. The resin was water washable, had a pH of 2.50 and a Gardner viscosity of "RS" at 25°C.

c. Two parts of this resin were mixed with one part of hardener VI (Example 3(d)) and the resulting hydrophilic adhesive was immediately spread on Douglas fir sheets (6 in. × 8 in. × ¼ in.) and pairs of the sheets were then clamped together at 150 p.s.i. for 3 hrs. to produce 2 billets (6 in. × 8 in. × ½ in.). Each of the billets was then sawed to form six specimens, each being approximately 1 in. × 3½ in. × ½ in. One set of specimens was dry conditioned and one set was wet conditioned, as described previously, and the specimens were then sheared. The shear strength (p.s.i.)/% wood failure values for dry- and wet-conditioned billets were 536/96 and 465/97 , respectively. A sample of adhesive prepared from 30 g. of resin and 15 g. of hardener VI had a Pot Life of 40 seconds.

EXAMPLE 7

Hardener formulations XI-XIII were prepared by mixing together the ingredients shown in Table 7 in the order recited. Hydrophilic adhesives were then prepared by combining one part of each of the hardeners with two parts of the resin of Example 5(c). Pot Lives for each of the adhesives are shown in Table 8 as are the pH's of the cured adhesives determined as described previously. Billets were prepared, conditioned and sheared as described in Example 7(c); the shear strength (p.s.i.)/% wood failure values for dry and wet conditioned billets are recorded in Table 8. It should be noted that the water-soluble epoxy resin functions as an acid scavenger under hydrolytic conditions as evidenced by the fact that the pH's of the three adhesives increased with increasing amounts of the epoxy resin. The water-soluble epoxy resin also increases the toughness of the cured adhesive.

Table 7

| Ingredient | Hardener (Weight Percent) XI | XII | XIII |
|---|---|---|---|
| "U.F. 85" | 64.37 | 49.89 | 31.97 |
| Water | — | 7.48 | — |
| Water-soluble Epoxy Resin* | — | 19.70 | 31.97 |
| Ethanol-formaldehyde Solution (50%) | 21.18 | — | 21.05 |
| "Dow Latex 612" | — | 15.04 | — |
| Calcium Carbonate | 1.00 | .99 | 1.00 |
| Aluminum Powder | 3.50 | 3.45 | 3.47 |
| Walnut Shell Flour | 5.95 | — | 5.88 |
| Pyrogenic Silica | 3.00 | 2.96 | 3.67 |
| "Advawet 43"** | 1.00 | .49 | .99 |

*Comprised of glycidyl ethers of polyhydric alcohols having two or more epoxy groups per molecule.
**Non-ionic emulsifying agent available from Cincinnati Milacron Chemicals.

Table 8

| Adhesive Resin | Hardener (Table 7) | Pot Life* (seconds) | pH of Cured Adhesive | Billet Shear Test -- Shear Strength (psi)/ % Wood Failure Dry | Wet |
|---|---|---|---|---|---|
| Example 5(c) | XI | 48 | 3.89 | 523/99 | 438/98 |
| Example 5(c) | XII | 38 | 3.99 | 436/96 | 465/97 |
| Example | XIII | 80 | 4.46 | 495/94 | 458/89 |

Table 8-continued

| Resin | Adhesive Hardener (Table 7) | Pot Life* (seconds) | pH of Cured Adhesive | Billet Shear Test -- Shear Strength (psi)/ % Wood Failure Dry | Wet |
|---|---|---|---|---|---|
| 5(c) | | | | | |

*30 g. resin and 15 g. hardener.

What is claimed is:

1. A hydrophilic resin composition comprising the reaction product of (a) a resin produced by reacting a ketone-aldehyde prepolymer with a polyhydroxy aromatic compound, the aldehyde:ketone mole ratio in said resin being from 1.5:1 to 6:1 and the polyhydroxy aromatic compound:aldehyde mole ratio in said resin being from 0.2:1 to 5:1, said resin containing substantially no free aldehyde and being free of dominant amide-forming substituents; with (b) an amine salt selection from the hydrochloric, nitric and sulfuric acid salts of m-hydroxy aniline and 2,6-diaminopyridine, the amount of the amine salt being from 0.05 to 2.0 parts by weight per part of said resin.

2. The composition of claim 1 wherein the aldehyde is formaldehyde and the ketone is acetone, methyl ethyl ketone or methyl isobutyl ketone.

3. The composition of claim 2 wherein the polyhydroxy aromatic compound is resorcinol.

4. The composition of claim 1 wherein the aldehyde is formaldehyde and the ketone is acetone.

5. The composition of claim 4 wherein the polyhydroxy aromatic compound is resorcinol.

6. The composition of claim 5 wherein the acetone: formaldehyde mole ratio is from 2.5:1 to 4.5:1 and the resorcinol:formaldehyde ratio is from 0.3:1 to 2:1.

7. The composition of claim 6 wherein the amine salt is m-hydroxy aniline hydrochloride and the amount thereof is from 0.1 to 1.0 part by weight per part by weight of said resin.

8. The composition of claim 5 wherein the acetone:-formaldehyde mole ratio is from 3:1 to 4:1 and the resorcinol:formaldehyde mole ratio is from 0.75:1 to 1.25:1.

9. The composition of claim 8 wherein the amine salt is m-hydroxy aniline hydrochloride and the amount thereof is from 0.1 to 1.0 part by weight of said resin.

10. The composition of claim 1 wherein the salt is m-hydroxy aniline hydrochloride.

11. The composition of claim 1 wherein the amount of the amine salt is from 0.1 to 1.0 part by weight per part by weight of said resin.

12. The composition of claim 11 wherein the salt is m-hydroxy aniline hydrochloride.

13. A rapid curing, hydrophilic adhesive composition comprising:

1. a hydrophilic resin composition comprising the reaction product of (a) a resin produced by reacting a ketone-aldehyde prepolymer with a polyhydroxy aromatic compound, the aldehyde:ketone mole ratio in said resin being from 1.5:1 to 6:1 and the polyhydroxy aromatic compound-aldehyde mole ratio in said resin being from 0.2:1 to 5:1, said resin containing substantially no free aldehyde and being free of dominant amide-forming substituents; with (b) an amine salt selected from the hydrochloric, nitric and sulfuric acid salts of m-hydroxy aniline and 2,6-diaminopyridine, the amount of the amine salt being from 0.5 to 2.0 parts by weight per part of said resin; and
2. a curing agent reactable with said reaction product at ambient temperature, the amount of said curing agent being sufficient to cause said composition to become insoluble and infusible.

14. The composition of claim 13 wherein the curing agent comprises an alkylene-donating compound.

15. The composition of claim 13 wherein the curing agent comprises formaldehyde or a formaldehyde-donating compound.

16. The composition of claim 13 wherein the aldehyde is formaldehyde and the ketone is acetone, methyl ethyl ketone or methyl isobutyl ketone.

17. The composition of claim 16 wherein the polyhydroxy aromatic compound is resorcinol.

18. The composition of claim 17 wherein the amine salt is m-hydroxy aniline hydrochloride and the amount thereof is from 0.1 to 1.0 part by weight per part by weight of said resin.

19. The composition of claim 13 wherein the ketone-:aldehyde mole ratio is from 2.5:1 to 4.5:1 and the polyhydroxy aromatic compound:aldehyde mole ratio is from 0.2:1 to 5:1.

20. The composition of claim 13 wherein the ketone-:aldehyde mole ratio is from 3:1 to 4:1 and the polyhydroxy aromatic compound:aldehyde mole ratio is from 0.75:1 to 1.25:1.

21. The composition of claim 1 wherein the amount of the amine salt is from 0.1 to 1.0 part by weight per part by weight of said resin.

22. The composition of claim 21 wherein the aldehyde is formaldehyde, the ketone is acetone, and the polyhydroxy aromatic compound is resorcinol.

23. The composition of claim 22 wherein the acetone:formaldehyde mole ratio is from 2.5:1 to 4.5:1 and the resorcinol:formaldehyde mole ratio is from 0.3:1 to 2:1.

24. The composition of claim 22 wherein the acetone:formaldehyde mole ratio is from 3:1 to 4:1 and the resorcinol:formaldehyde mole ratio is from 0.75:1 to 1.25:1.

25. The composition of claim 28 wherein the salt is m-hydroxy aniline hydrochloride.

26. A process for producing a hydrophilic resin composition comprising reacting (a) a resin produced by reacting a ketone-aldehyde prepolymer with a polyhydroxy aromatic compound, the aldehyde:ketone mole ratio in said resin being from 1.5:1 to 6:1 and the polyhydroxy aromatic compound:aldehyde mole ratio in said resin being from 0.2:1 to 5:1, said resin containing substantially no free formaldehyde and being free of dominant amide-forming substituents; with (b) an amine salt selected from the hydrochloric, nitric and sulfuric acid salts of m-hydroxy aniline and 2,6-diaminopyridine, the amount of the amine salt being from 0.1 to 1.0 parts by weight per part of said resin.

27. The process of claim 26 wherein the aldehyde is formaldehyde and the ketone is acetone, methy ethyl ketone or methyl isobutyl ketone.

28. The process of claim 27 wherein the ketone:formaldehyde mole ratio is from 2.5:1 to 4.5:1 and the polyhydroxy aromatic compound:formaldehyde mole ratio is from 0.3:1 to 2:1.

29. The process of claim 28 wherein the polyhydroxy aromatic compound is resorcinol.

30. The process of claim 27 wherein the ketone:aldehyde mole ratio is from 3:1 to 4:1 and the polyhydroxy aromatic compound:aldehyde mole ratio is from 0.75:1 to 1.25:1.

31. The process of claim 30 wherein the polyhydroxy aromatic compound is resorcinol.

* * * * *

UNITED STATES PATENT AND TRADEMARK OFFICE
CERTIFICATE OF CORRECTION

PATENT NO. : 3,947,425
DATED : March 30, 1976
INVENTOR(S) : Harlan G. Freeman et al.

It is certified that error appears in the above-identified patent and that said Letters Patent are hereby corrected as shown below:

Column 17, line 47: after "weight" insert --per part by weight--.

Column 17, line 62: delete the dash (-) between "compound-aldehyde" and insert therefor a colon (:).

Column 18, line 54: delete "28" and insert therefor --21--.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*